US007278378B2

(12) United States Patent
Counterman

(10) Patent No.: US 7,278,378 B2
(45) Date of Patent: Oct. 9, 2007

(54) REGENERATIVE AIR PREHEATER LEAKAGE RECOVERY SYSTEM

(76) Inventor: Wayne S. Counterman, 2410 Lewis Rd., Wellsville, NY (US) 14895

(*) Notice: Subject to any disclaimer, the term of this patent is extended or adjusted under 35 U.S.C. 154(b) by 115 days.

(21) Appl. No.: 11/265,380

(22) Filed: Nov. 2, 2005

(65) Prior Publication Data
US 2006/0090469 A1    May 4, 2006

Related U.S. Application Data

(60) Provisional application No. 60/624,767, filed on Nov. 2, 2004.

(51) Int. Cl.
*F28D 17/04* (2006.01)
(52) U.S. Cl. .............................. 122/1 A; 165/9; 165/10
(58) Field of Classification Search ................ 122/1 A; 165/8, 9, 10; 432/179–181
See application file for complete search history.

(56) References Cited

U.S. PATENT DOCUMENTS 5,915,339 A    6/1999  Cox et al.
6,328,094 B1 * 12/2001 Mori et al. .................... 165/8
6,397,785 B1    6/2002  Fierle
6,581,676 B2    6/2003  Fierle et al.

* cited by examiner

Primary Examiner—Gregory A. Wilson
(74) Attorney, Agent, or Firm—Vincent G. LoTempio; Kloss, Stenger, Kroll & LoTempio

(57) ABSTRACT

A regenerative air preheater leakage recovery system comprising a coal-fired steam generator in fluid communication with a regenerative air preheater. The regenerative air preheater adapted to provide a heat exchange between a flow of cool air and of hot flue gas to convert the cool air into the heated combustion air exiting to the steam generator. A combination of seals for effecting at least one plenum that is in fluid communication with the heated combustion air flow and the flow of hot flue gas relative to the regenerative air preheater. A captured flow of leakage, diverted from the flow of heated combustion air and directed by means of a fan to re-enter the regenerative air preheater at a location substantially separate from where the flow of cool air is received in the regenerative air preheater to be further heated therein and exit as the flow of heated combustion air.

13 Claims, 9 Drawing Sheets

REGENERATIVE AIR PREHEATER LEAKAGE RECOVERY SYSTEM

This application claims priority of U.S. Provisional Patent Application 60/624,767 filed on Nov. 2, 2004, titled: REGENERATIVE AIR PREHEATER

BACKGROUND OF THE INVENTION

Field of the Invention

The present invention relates to the field of coal-fired steam generators, and more particularly to a means to reduce the amount of air to gas leakage in a rotary regenerative air preheater.

In the combustion of coal, oil or natural gas in utility steam generators, the heat released by the combustion of the fuels is captured and used to generate steam which drives a steam turbine to generate electricity. As the heat is recovered from these combustion products, their temperature is reduced to a point where additional sensible heat cannot be effectively recovered by the water or steam. A large portion of the remaining sensible heat is recovered and returned to the steam generation system by use of an air preheater. The combustion air is preheated by extracting heat from the boiler exhaust combustion gases in a counterflow or cross counterflow heat exchanger. The efficiency of the boiler is increased as a larger percentage of the available heat produced by the combustion of the fuels is thereby utilized by the boiler.

The most common type of air preheater for utility steam generators is the rotary regenerative air preheater. This type of air preheater contains moving or rotating elements. Due to the gaps or clearances required for the rotation of the element containing portion of the equipment relative to the fixed casing and duct connections, there is a significant amount of leakage of the higher-pressure air to the lower pressure gas stream. Many types of seals and devices to adjust the gap size during operation have been employed to reduce leakage. A design feature often employed for new and in some cases retrofitted to old air preheaters is the use double seals to create an intermediate plenum pressure which reduces the total air to gas leakage across the seals. This concept has been practiced commercially for a long time and has been taught in U.S. Pat. No. 5,915,339, U.S. Pat. No. 6,397,785, and U.S. Pat. No. 6,581,676. The double seals create a plenum which typically has a pressure intermediate to the pressures of the fluids it communicates with. The plenum pressure differential to the low pressure fluid is typically half that would exist without the plenum. Reducing the leakage pressure differential by half produces a reduction in leakage of 1 divided by the square root of 2, or by 0.707. In essence leakage is reduced by about 29% when double seals are utilized.

Environmental concerns require reduction in the amount and types of pollutants emitted by combustion processes. The size and cost of many of the devices utilized to remove or reduce these pollutants is proportional to the amount of flue gases they must treat. There has been a longfelt need for technology which reduces the amount or volume of flue gases that must be treated by reducing the amount of air to gas leakage in a rotary air preheater.

Due to insufficient heat to dry high moisture coal many coal-fired utility steam generators are limited in the amount of electric energy they can produce. Although this output limitation occurs during specific weather or fuel conditions, it may also exist for all or the majority of the utility operating hours. Powder River Basin or PRB coals are now used at many facilities not initially designed to fire that coal. Powder River Basin or PRB coal, and lignite coals have high moisture content. The original system design of many coal-fired utility steam generators cannot provide a primary air temperature high enough to dry the PRB coal sufficiently enough to produce the amount of steam the generator is capable of generating. The thermal drying capacity of the primary air serving the coal pulverizers is not large enough to dry all the coal needed. Additional thermal capacity cannot be added by increasing the mass flow as undesirable impacts occur from the higher velocity. When the velocity of the primary air flow gets too high within the pulverizer, it can sweep coarse coal particles out of the pulverizer. Coarse particles do not completely burn and the negative result is wasted fuel. Also, the particles not completely burned become part of the fly ash collected within the emissions control device. Coarse coal particles can render the fly ash unsaleable for use in concrete.

The additional thermal capacity must come from a higher temperature. No economical means are available to increase the drying capacity. Thus the state of the art is clearly not ideal and there is a need for a means to increase the drying/thermal capacity for a steam generator with a regenerative air preheater.

Thus it is readily apparent that there is a longfelt need for improved systems and means of operation which would reduce leakage and which will increase pulverizer drying capacity.

SUMMARY OF THE INVENTION

It is accordingly a primary object of the present invention to provide an improved regenerative air preheater leakage recovery system.

It is another object of the present invention is to provide an improved regenerative air preheater leakage recovery system that reduces the amount of air to gas leakage in a rotary regenerative air preheater.

It is a further object of the present invention to provide an improved regenerative air preheater leakage recovery system wherein the amount or volume of flue gases that must be treated is reduced by reducing the amount of air to gas leakage in a rotary air preheater.

Another object of the present invention is to introduce a captured leakage fluid flow at a location within the element sheets that first leave or rotate from the flue gas side of the regenerative air preheater so as to produce a minimal reduction in the temperature difference or head between the gas and air flows.

A further object of the present invention is to provide an improved regenerative air preheater leakage recovery system that increases thermal energy for coal drying while recovering thermal energy.

Another object of the present invention is to provide an improved regenerative air preheater leakage recovery system that allows optimization of the amount of thermal energy for coal drying, and boiler efficiency.

These and other objects are achieved in accordance with the present invention which provides a regenerative air preheater leakage recovery system that comprises a coal-fired steam generator in fluid communication with a regenerative air preheater. The steam generator is adapted to receive a flow of heated combustion air exiting from the air preheater and to discharge a flow of hot flue gas to the air preheater. In the preheater, a flow of air is heated by heat exchange with a counter flow of hot flue gas exiting from the steam generator. The flow of air, now heated by the heat exchange, exits the air preheater as heated combustion air and is routed to the steam generator. A portion of the heated combustion air is diverted to form a separate flow of hot air directed through a source of pulverized coal to form a mixture of heated air and pulverized coal. This mixture is routed to the steam generator for combustion therein. The flow of the mixture to the steam generator may be assisted by the aid of an exhauster fan between the source of pulverized coal and the steam generator. In another embodiment, utilizing two air preheaters, an air fan, providing incoming air to one of the preheaters, may provide additional positive pressure to the exiting air stream in communication with the pulverizer. In still another embodiment, a trisector preheater may be employed providing a rotor in contact with primary air flowing to the pulverizer, and secondary combustion air going to the boiler.

In any embodiment, using any type of preheater a combination of radial, circumferential and/or axial seals is used for effecting at least one plenum that is in fluid communication with the heated combustion air flow and the flue gas flow relative to the regenerative air preheater. A fan is used for effecting pressure control of the plenum to capture a leakage flow from the flow of heated combustion air and the flow of cool air, a portion of leakage flow is diverted from the plenum and is directed by means of the fan to re-enter the air preheater at a location substantially separate from where the flow of cool air is received in the regenerative air preheater to be further heated therein and exit as the flow of heated combustion air to the steam generator either via the pulverizer or directly to the boiler. Thus, the captured leakage flow is used to control, especially to increase, the overall heat content of the flow of heated combustion air exiting to the steam generator and resulting in overall higher energy efficiency for the system and an increased coal drying capacity of the pulverizer.

Furthermore, in a preferred embodiment, the captured leakage flow is routed through a heat extraction device, such as a heat exchanger, for additional utilization of the heat energy contained therein, for example, by transfer to a lower temperature fluid, for electrical power generation, or other purpose. In one such embodiment, heat energy may be transferred to a liquid, such as toluene, or a thermal fluid which, in turn may be utilized for other purposes. On exiting the heat extraction device, the captured leakage flow may then be directed to re-enter the air preheater to be further heated therein and exit as the flow of heated combustion air to the steam generator.

DETAILED DESCRIPTION OF THE INVENTION

Figure 1:
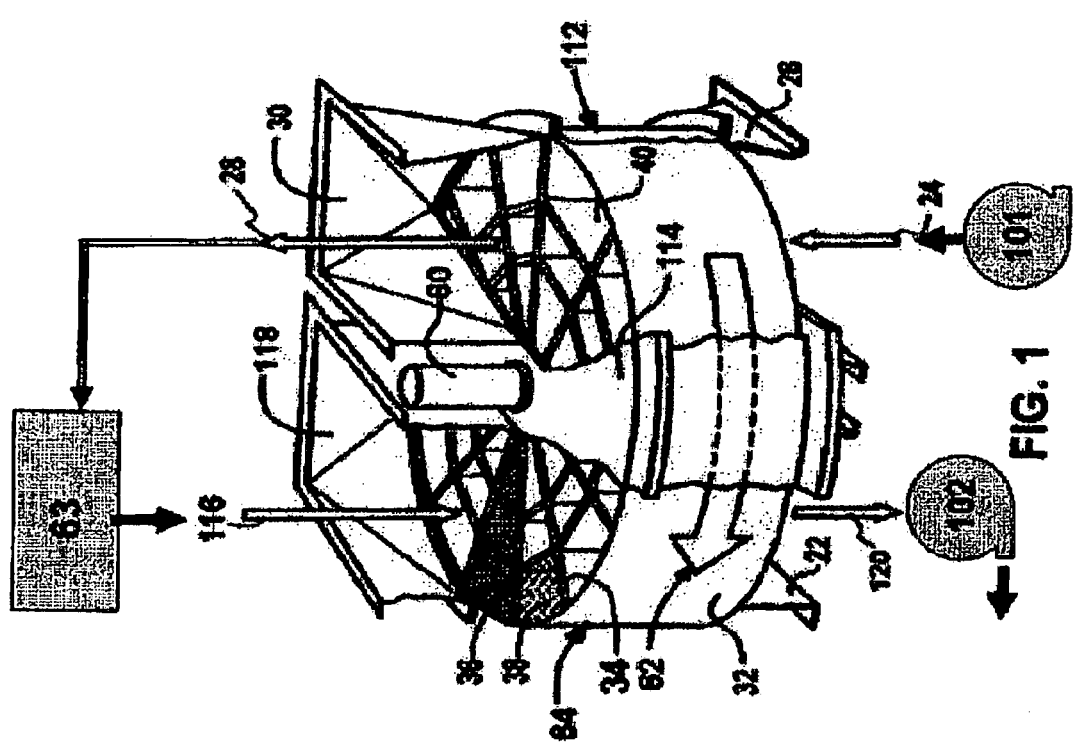
FIG. 1 is a generalized perspective view of a conventional art typical bisector regenerative air preheater.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. §112.

Currently in the coal-fired steam generators industry there are thousands of pre-existing steam generators using a regenerative air preheater. Bisector and trisector air preheaters are often utilized for coal fired boilers. A problem in the industry is that many older regenerative air preheaters suffer from high air to gas leakage which negatively impacts the effectiveness of air pollution reduction equipment. A further problem in the industry is that many coal-fired utility steam generators are limited in the amount of electric energy they can produce due to insufficient heat to dry high moisture coal. The additional thermal capacity must come from a higher temperature and no economical means are available to increase the drying capacity. Thus the state of the art is clearly not ideal and there is a need for a means to reduce leakage and to increase the drying/thermal capacity for a steam generator with a regenerative air preheater.

Adverting now to the drawings, FIG. 1 is provided as an example of a bisector air preheater system commonly used in many coal-fired steam generating plants or boilers. FIG. 1 illustrates a partially cut-away perspective of a bisector air preheater with vertical shaft 60. A drive motor, not shown, provides rotation 62 of rotor 64 relative to the fixed housing 112. Fixed housing 112 is attached to four ducts, air inlet duct 26, air outlet duct 30, gas inlet duct 118, and gas outlet duct 22. Fixed housing 112 is divided by two sector plates 114. The second sector plate 114 located between the gas inlet duct 118 and the air outlet duct 30 is mostly obscured by those ducts. The bottom of the preheater contains a corresponding sector plate 114 (not shown). This type of regenerative air preheater is commonly known as a bisector air preheater since there are two flow streams separated by sector plate 114. Gas inlet flow 116 enters hot face of the rotor of the air preheater through gas inlet duct 118, with the gas outlet flow 120 leaving the rotor via gas outlet duct 22. Gas inlet flow 116 consists of the products of combustion of the fuel burned in the boiler 63, typically including the particulate or ash when a solid fuel such as a coal is burned in the boiler. Gas inlet flow 116 is the hottest of the four flows which go through the rotor. Boilers 63 are typically operated at about atmospheric pressure. The combustion air flow is pressurized and flows from a fan 101 through rotor 64, and ultimately into boiler 63. The flue gas flow is pulled or induced from the boiler by a fan 102 which is located downstream of the regenerative air preheater rotor 64.

Typically the flow arrangement is counterflow with the air inlet flow 24 entering air inlet duct 26 and air outlet flow 28 exiting via air outlet duct 30. Air outlet flow 28 is the second hottest flow. The thermal effectiveness of the regenerative air preheater increases as the temperature of air outlet flow 28 approaches the temperature of gas inlet flow 116.

Rotor 64 is divided by a plurality of partitions or diaphragms 34. Diaphragms 34 extend radially from a post or hub (not shown) to the outer periphery of the rotor or outer shell 32. The diaphragms define a plurality of pie shaped sectors 36. Each pie shaped sector 36 is further subdivided into generally trapezoidally-shaped compartments 38 by stay plates 40 which provide structural support to the assembly. In each of the trapezoid compartments are heat transfer elements, (not shown) generally packaged within baskets to facilitate quick replacement of elements which have become thin, plugged or otherwise reached end of life. Heat transfer elements are typically made of metal in thicknesses of 0.049" to 0.019". Typical materials are carbon steel or low alloy corrosion steel. Special coatings such as porcelain enamel are used to provide increased corrosion resistance typically for the cold end. The cold end of the air preheater is that portion wherein air inlet flow 24 enters and gas outlet flow 120 exits. The hot end of the air preheater is that portion where gas inlet flow 116 enters and the air outlet flow 28 exits.

Figure 2:
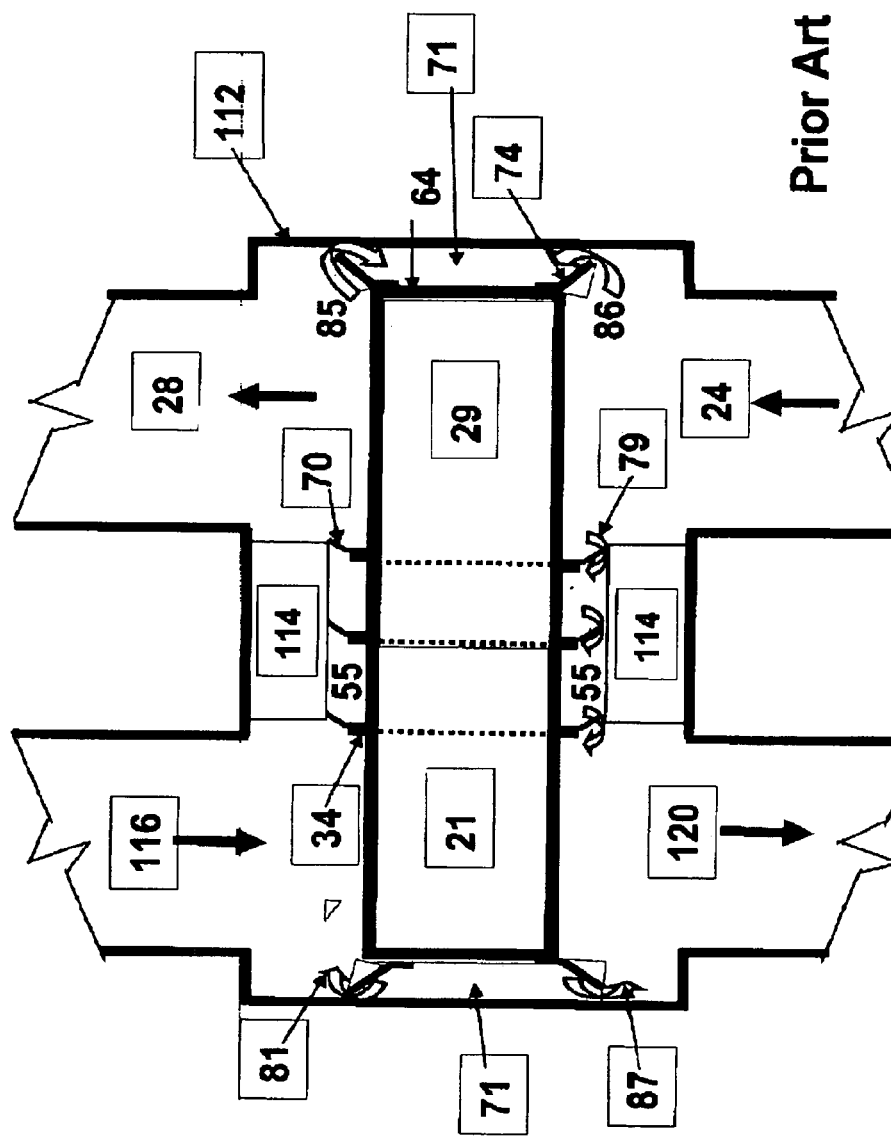
FIG. 2 is a flow schematic showing a conventional art bisector air preheater with double radial seals and with circumferential seals

FIG. 2 shows a simplified cross section of a bisector air preheater which utilizes conventional art of double radial seals and circumferential seals to minimize leakage. At any time, a portion rotor 64 is in communication with the air inlet flow 24 which flows though the rotor and the heat transfer elements contained therein. Air side 29 is the portion of the rotor in communication with the air inlet flow. Air outlet flow 28 exits the hot end of rotor 64 from the air side 29. Opposing air side 29 is gas side 21 which is in communication with gas inlet flow 116 which enters the hot end of rotor 64 and gas outlet flow 120 which exits the cold end of rotor 64.

A plurality of radial seals 70 are mounted on each diaphragm 34 at the hot and the cold ends of the rotor. In some designs, typically European, the diaphragm is used as the sealing member. When diaphragm 34 is utilized as a seal, it is machined to provide a consistent and controlled gap between the many diaphragms and sector plate 114. When radial seals 70 are used in the industry they are adjustably connected to diaphragm 34 to allow adjustment to provide the required consistent and small clearances to the sector plate. Older air preheaters were "single sealing" designed such that typically during rotation only one seal was in close proximity to the sector plate 114. With single radial sealing there is an instant where two radial seals are in close proximity to the sector plate which resulted in much leakage. Typically to provide a reduction in leakage, additional diaphragms 34 and radial seals 70 creating more sectors were added. FIG. 2 shows sector plate and radial seal spacing at an instant during rotation of the rotor where three seals are rotated "on" the sector plate. A plenum is created between two of the seals. Because three seals are rotated on the sector plate for only an instant in time, only two seals continuously remain in close proximity with the sector plates. At least two seals are always in close proximity to sector plate 114 in the double seal design, hence the nomenclature in the industry of "double seals" or "double sealing." When such double radial sealing is employed, a radial seal plenum 55 is created. Radial seal plenum 55 is created as a sector 36 (as shown in FIG. 1) is completely rotated between sector plates 114 and is bounded on the hot and cold end of the rotor by diaphragms 34 and radial seals 70 of sector 36. Radial seal plenum 55 is a pie shaped volume with a height equal to the spacing between the sector plate at the hot end and the sector plate at the cold end. Air leakage 79 is shown at the cold end radial seals. Similar leakage occurs at the hot end radial seals.

Also required for regenerative air preheaters that rotate is a means to prevent flow from the outer circumference of each pie shaped sector from going into the annulus created between outer shell 32 (as shown in FIG. 1) of the rotor 64 and housing 112. Circumferential seals 74 are one means to prevent the leakage flow. Circumferential seals 74 are positioned on both the hot end and the cold end of the air preheater. Circumferential seals are typically mounted to rotor 64 and seal against housing 112 or some replaceable member such as an angle (not shown). Circumferential seals 74 extend completely around the outer circumference of rotor 64 at both the cold end and the hot end of the rotor. The annular volume created by circumferential seals 74 between the outer shell of rotor 64 and housing 112 is a plenum 71. Plenum 71 will reach a pressure in a range of pressures between the pressure of cold air inlet flow 24 and the pressure of cold gas outlet flow 120.

It should be understood by one skilled in the art that the air inlet flow 24 has the maximum positive pressure of the four flows in communication with rotor 64 (based on the fan locations and flow directions as shown in FIG. 1). The reason that plenum 71 will reach a pressure somewhere between the pressure of the air inlet flow and the pressure of the gas outlet flow is that the gas outlet flow has the largest negative pressure of the four flows and air inlet flow has the largest positive pressure of the four flows. The actual pressure of the plenum depends on the pressures of the gas outlet and the air inlet and on the size of the leakage gaps. Typically the actual pressure of the plenum is some pressure higher than either the pressure of gas inlet flow 116 or the gas outlet flow 120. The gas outlet pressure must be lower than the gas inlet to maintain flow direction. FIG. 2 illustrates leakage 85 from air outlet flow 28 and leakage 86 from air inlet flow 24 into plenum 71. Since the pressure of plenum 71 is greater than the gas side pressures, leakage 81 occurs from plenum 71 into gas inlet flow 116 and leakage 87 occurs from the plenum 71 into gas outlet flow 120.

Figure 3:
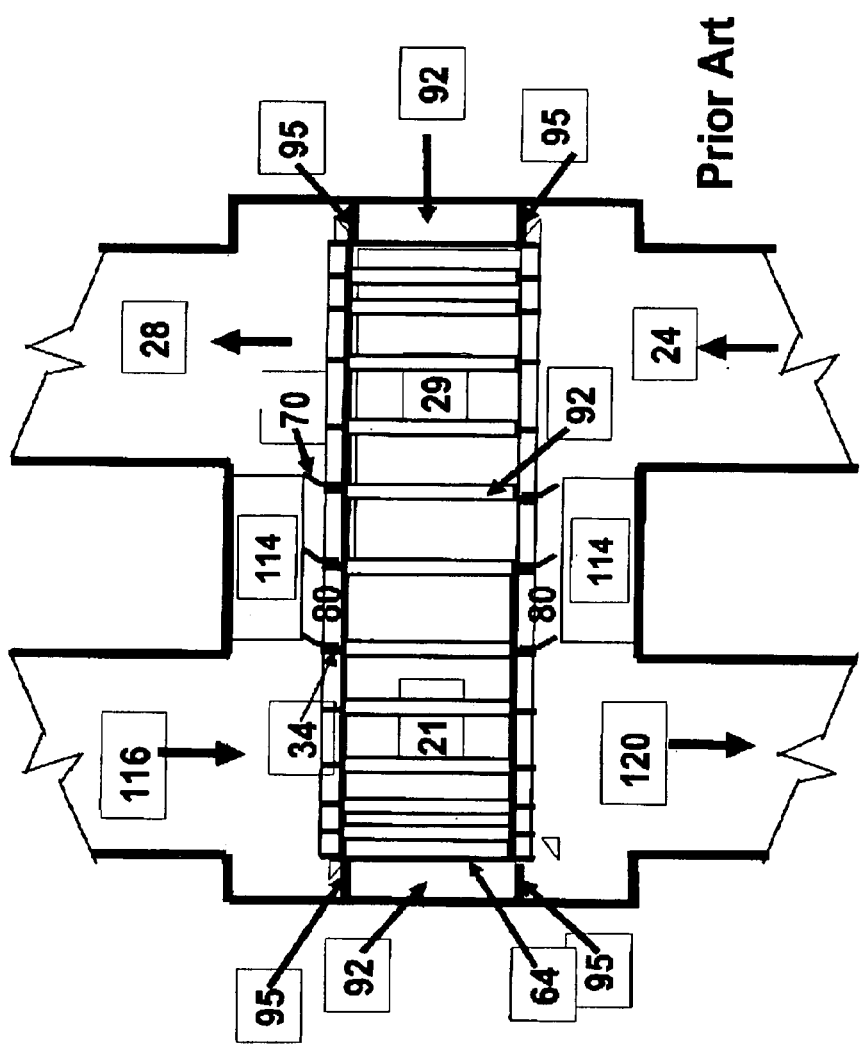
FIG. 3 is a flow schematic showing a conventional art bisector air preheater with double radial seals and with axial seals

Large regenerative air preheaters often employ a different sealing system than the circumferential seals 74 shown in FIG. 2. FIG. 3 shows a conventional art bisector air preheater similar to that of FIG. 2, having double radial seals 70, but employing axial seals 92 instead of circumferential seals 74 shown in FIG. 2. Circumferential seals 74 have a seal length equal to the circumference of the rotor. A system using axial seals has an axial seal length approximately equal to the axial height of rotor 64. Axial seals 92 are located on the outside surface of outer shell 32 opposed each location where a diaphragm 34 contacts outer shell 32 generally oriented in an axial direction. Axial seals 92 extend along the outer shell height from hot end bypass seal 95 to the cold end bypass seal 95.

The term "double axial seals" indicates that at least two axial seals 92 are at all times in close proximity with the axial seal plate 94 (shown in FIG. 4) and provide a sealing function. Axial seals 92 are used to provide a substantial separation of from air flow to gas flow by creating a minimal gap between the axial seal and axial seal plate 94. Bypass seal 95 is used to prevent the air inlet flow from bypassing the air side of rotor 64 and entering the air outlet flow without coming in contact with the elements contained in rotor 64. Flow bypass of the heating elements for both gas side 21 and air side 29 is prevented or at least minimized by use of bypass seals 95.

Figure 4:
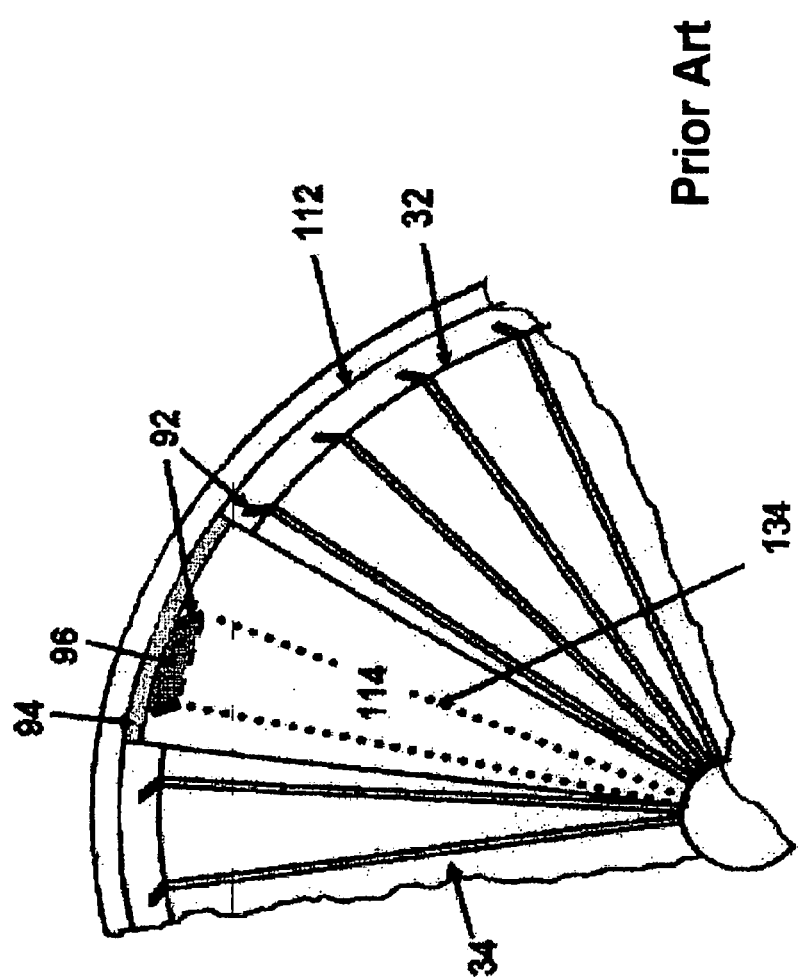
FIG. 4 is a partial plan view of one regenerative air preheater sector plate, axial seal plate and double axial seals.

FIG. 4 is a partial cutaway bottom view of one sector plate 114, axial seal plate 94 and double axial seals 92. FIG. 4 illustrates how double axial seals are employed and plenum 96 exits between axial seals 92 and axial seal plate 94. Plenum 96 is bounded by a portion of outer shell 32 located between axial seals 92 and by axial seal plate 94. The plenum height is the distance between the hot and cold end bypass seals (as shown in FIG. 3). Dotted line 134 depicts where the diaphragms are located underneath the sector plate at that point in the rotation of the rotor.

Figure 5:
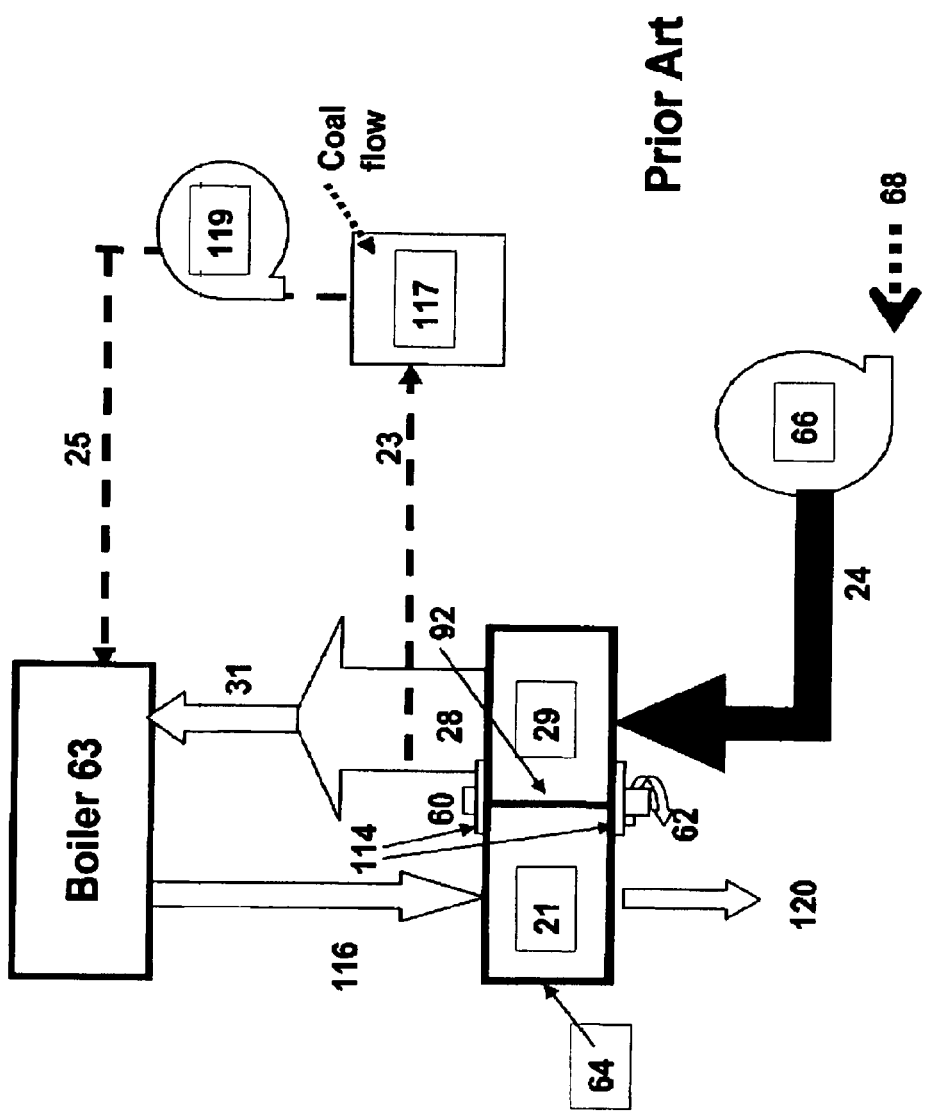
FIG. 5 is a flow schematic showing a conventional art boiler utilizing a bisector air preheater and pulverizer exhauster fan.

FIG. 5 is flow schematic showing a conventional art boiler system typically used in coal-fired steam generating plants. FIG. 5 shows a boiler system which utilizes a bisector air preheater to provide both secondary air flow 31 and primary air flow 23. On large boilers more than one preheater can be used. Pulverizer 117 in this system operates at a slight negative pressure. Combustion air fan 66 provides flow of combustion air 68. As with the air preheater, more than one such fan can be used if size dictates, but they will be essentially identical in design and function. Combustion air fan 66 creates a positive pressure and provides air inlet flow 24 to rotor 64. The rotor transfers heat from gas side 21 to air side 29 with air outlet flow 28 exiting rotor 64. In addition to sector plates 114, at least one other sealing system is utilized to substantially separate air side 29 from gas side 21 such as axial seals 92 (FIGS. 3 & 4), or circumferential seals 74 (FIG. 2). Because of the rotation of the rotor, the temperature of air outlet flow 28 is not uniform above rotor 64 on air side 29. Typically a subset of the hotter portion of air outlet flow 28 is removed and induced to flow to pulverizer 117 by pulverizer exhauster fan 119. Upon leaving air outlet duct 30, this subset becomes primary air flow 23 and is the flow that both dries the coal and transports it to the burners of boiler 63. The remainder of air outlet flow 28 becomes secondary air flow 31 and goes to the burners of boiler 63 to complete combustion.

One feature common to the plenums that exist in regenerative air preheaters is their pressures are dictated by the pressures of the flows they have communication with and by the relative size of the leakage gaps or areas at each flow location. Plenums occur naturally or are created by design modification, for example by use of seals to create a circumferential seal plenum 71, the radial seal plenum 55, and the axial seal plenum 96. When double sealing is used to create a plenum, the leakage is somewhat reduced (~29%), leakage is based on the aforementioned pressures and gaps.

Figure 6:
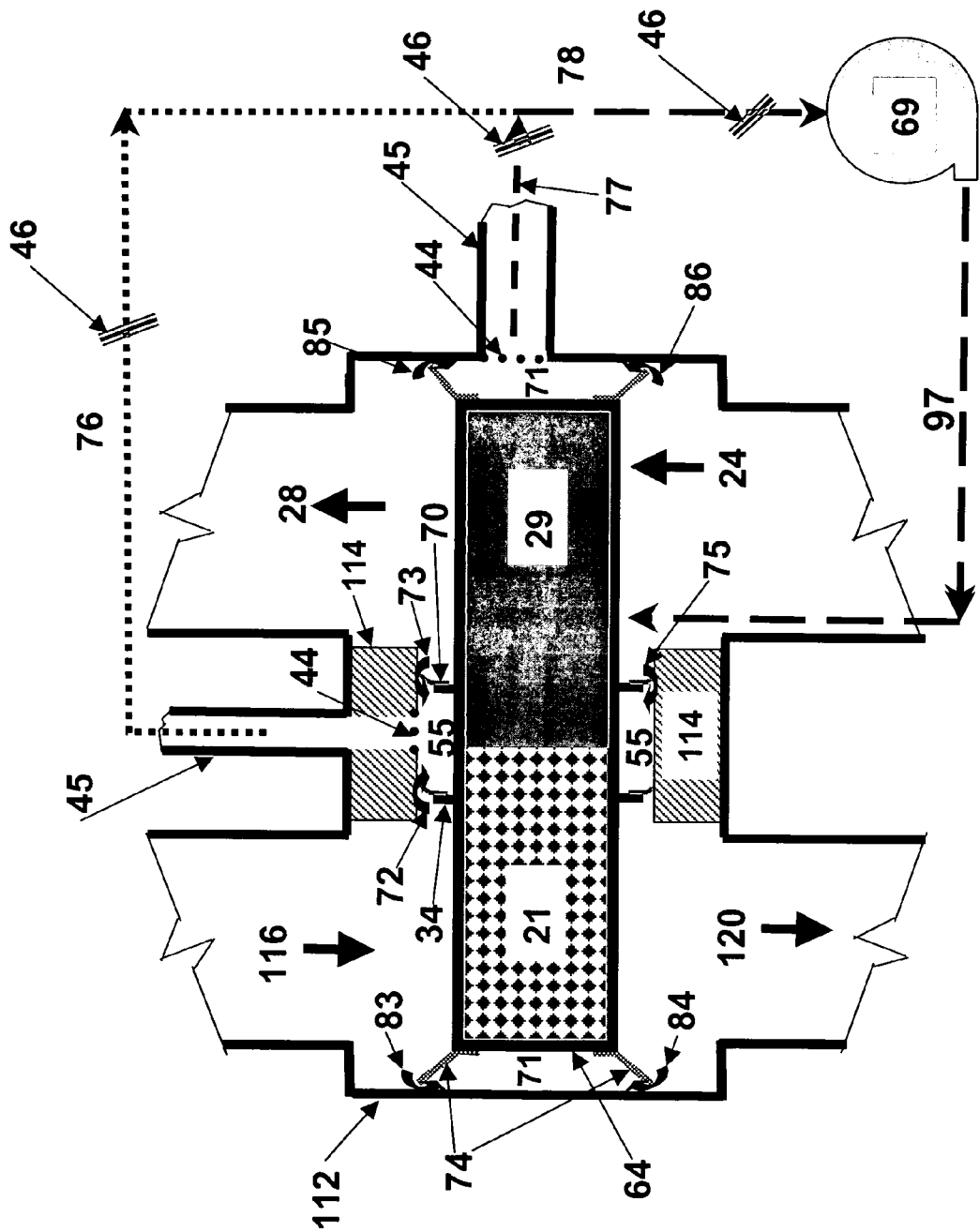
FIG. 6 shows a flow schematic of a preferred embodiment of a leakage recovery system of the present invention applied to a bisector air preheater.

FIG. 6 illustrates the preferred embodiment of the invention as applied to a bisector air preheater with radial and circumferential seals. The preferred embodiment of the present invention, utilizes an active system consisting of a fan, dampers, sensors, controllers, ductwork, and penetrations to the plenum to control the pressure within the plenum, and to capture the flow of air that would normally leak into the gas flow and return it to the air flow. FIG. 6 show a simplified cross section of a bisector air preheater which utilizes double radial seals and circumferential seals to minimize leakage. In this view, rotor 64 is at a typical rotational position, having rotated two radial seals 70 in close proximity to sector plate 114. Flow communication between radial seal plenums 55 and circumferential seal plenums 71 with air inlet flow 24 of the air preheater is accomplished by use of fan 69, interconnecting ductwork 45 and penetrations 44. The penetration of the sector plate 114 to create radial seal plenum 55 in the hot end will also allow evacuation of leakage from the cold end of the air preheater since there is natural flow communication through the porous element sheets. However, an additional connection may be made at the cold end sector plate to minimize pressure losses. If the magnitude of pressure at the radial seal plenum 55 of the cold end is equal to the magnitude of pressure of gas outlet flow 120, there will be some gas inlet flow 116 pulled through the seal gap created by the radial seals 70 separating the gas side from the radial seal plenum 55. This flow 72 occurs since the pressure of the gas inlet flow 116 is greater than the pressure of the gas outlet flow 120. In this embodiment the magnitude of pressure of radial seal plenum 55 at the cold end has been set equal to that of the gas outlet flow 120. Therefore there is no flow or leakage from the gas outlet flow 120 into radial seal plenum 55, or visa versa.

Air inlet flow 24 has the highest pressure of the four flows and will have substantial flow 73 through the seal gap created by the radial seal 70 separating the air side 29 from the radial seal plenum 55. Some of the air outlet flow 28 flows 75 through the gap created by a radial seal 70 and sector plate 114 and flows into radial seal plenum 55. The flows, 72, 73, and 75 combine to form radial seal leakage flow 76. The magnitude of the radial seal leakage flow 76 depends to a large extent on the size of the gaps or openings between radial seals 70 and sector plate 114 and the pressure of radial seal plenum 55. It should be understood by one skilled in the art that the plenum pressure set-point may be adjusted over a range of pressures to maximize leakage captured, minimize amount of gas flowing into plenum or achieve other objectives. If the plenum pressure is lowered below the pressure of gas outlet flow 120, an additional flow stream will be created, which will combine with the streams 72, 73, and 75 producing resulting total radial seal leakage flow 76.

The circumferential seals create an annular plenum 71 between rotor 64 and housing 112. When fan 69 creates sufficient suction to reduce the pressure of annular plenum 71 to slightly lower than the pressure of gas outlet flow 120, air to plenum leakages of air outlet flow 28, air inlet flow 24, gas inlet flow 116 and a small amount of gas outlet flow 120 occur. FIG. 6 shows these leakage flows as 85, 86, 83, and 84 respectively. These flows combine exiting annular plenum 71 forming flow 77. Flow 77 combines with captured radial leakage flow 76 to form flow 78. Flow 78 is at a negative pressure. A pressure rise from fan 69 must occur to allow the captured leakage flow 97 to re-enter the air inlet of rotor 64. Captured leakage flow 97 enters below rotor 64 at air side 29 in a specific location without substantially mixing with the air inlet flow 24. Space restrictions, pressure drop considerations or other factors may make it desirable to use more that one penetration of the housing to collect the circumferential seal leakages 85, 86, 83, and 84.

While FIG. 6 shows both a radial seal leakage recovery system adapted to radial seal plenum 55 and a circumferential seal leakage recovery system adapted to plenum 71, it must be understood that the seal leakage recovery system as shown in FIG. 6 is for illustration purposes only and it should be readily apparent to those of ordinary skill in the art that a preferred embodiment of the leakage recovery system of the present invention could employ either such system or a combination of both. In a preferred embodiment of the leakage recovery system of the present invention radial seal plenum 55 and captured radial seal leakage flow 76 is the only leakage recovery system employed. And in another preferred embodiment circumferential seal annular plenum 71 with flow 77 is the only leakage recovery system employed. Pressure control dampers 46 may be employed in any or all flows, such as for example radial seal leakage flow 76, flow 77, flow 78 and captured leakage flow 97. These dampers along with appropriate controllers and control logic are utilized to maintain the individual plenums at desired levels to achieve the amount of leakage recovery desired.

Figure 7:
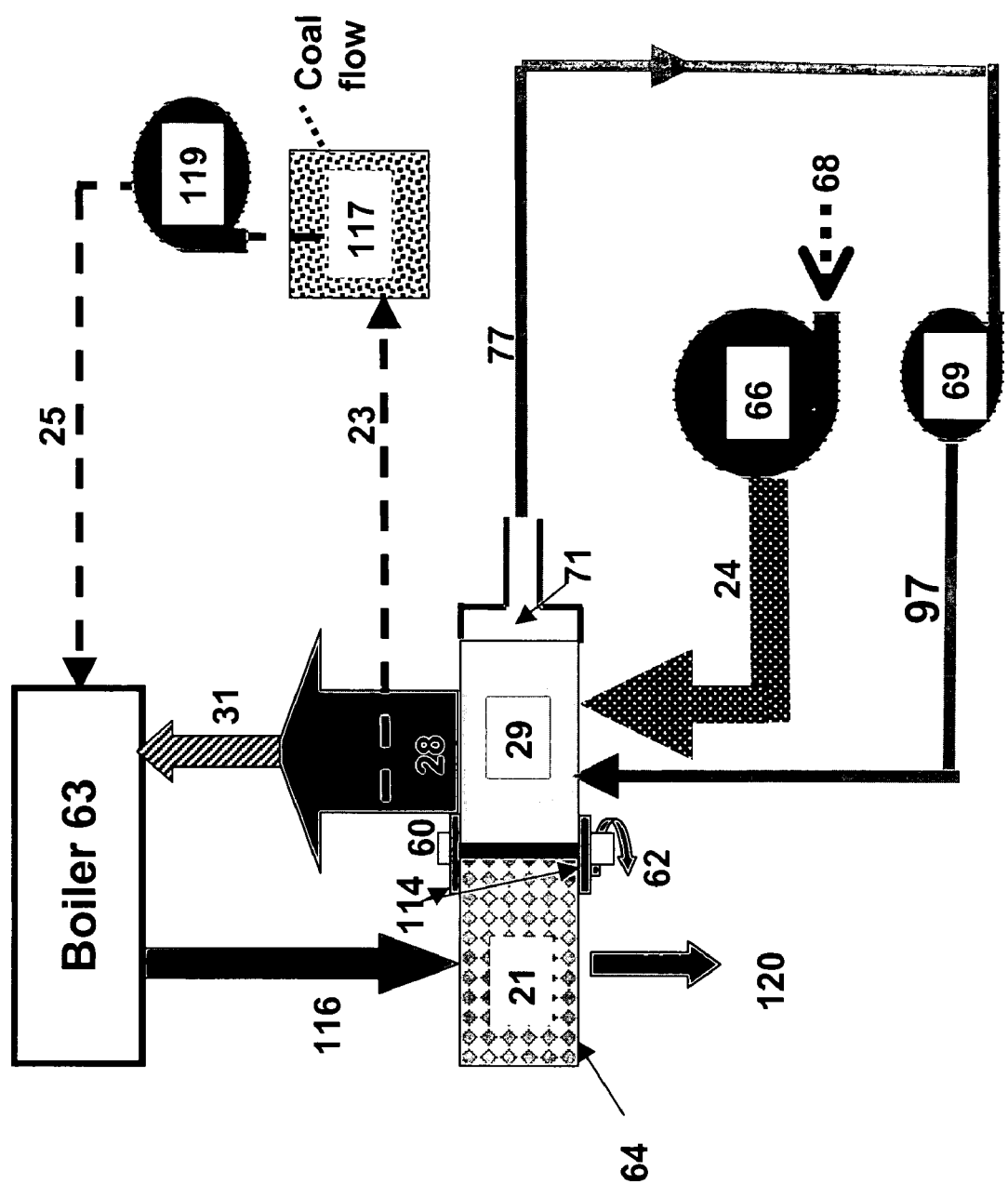
FIG. 7 is a flow schematic a preferred embodiment of a leakage recovery system of the present invention utilizing a bisector air preheater equipped with a leakage recovery system for the circumferential seals.

FIG. 7 shows a flow schematic of a preferred embodiment of a leakage recovery system of the present invention applied to a bisector air preheater. The specific beneficial thermodynamic feature of this embodiment is that it provides an increase in pulverizer drying capacity. Captured leakage flow 97 is returned to the air preheater where it is introduced into rotor 64 on air side 29 at a location near where the element sheets first rotate into the air side from the gas side so as to achieve a significant temperature increase in primary air flow 23. Introducing captured leakage flow 97 at this location provides flow communication to the portion of the air outlet flow where primary air flow 23 is extracted. Since captured leakage flow 97 has a significantly hotter temperature than that of the typical air inlet flow, it is not desirable to introduce said flow at or near a location where the element sheets are about to rotate into gas side 21. Introducing the captured leakage flow 97 to the elements at their coldest position in the rotation, would increase the temperature of the element sheets prior to their rotation into the flue gas stream and thus the element sheets would not be able to recover the same amount of energy from the flue gas. Further, introducing captured leakage flow 97 at this location would not provide the desired effect of increasing the temperature of the primary air flow, since the primary air flow is removed from the air preheater air outlet in proximity to the hottest location of the rotor.

Rotor 64 receives gas inlet flow 116 from boiler 63. Combustion air 68 is pressurized by combustion air fan 66 and flows to rotor 64. As rotor 64 rotates, the element sheets within the rotor absorb heat while in gas side 21, and give off heat while in air side 29, thereby decreasing the temperature of gas inlet flow 116 and increasing the temperature of both the captured leakage flow 97 and air inlet flow 24. The two fluids are kept substantially separated such that the temperature of air inlet flow 24 is not significantly increased and the temperature of captured leakage flow 97 is not substantially reduced. The two flows are heated in the rotor and exit the hot face of the rotor. Since the diaphragms, stay plates, and in some cases the element design itself substantially prevent mixing of flow once it has entered the cold face of the rotor, keeping the captured leakage flow separate from the air inlet flow 24 must produce flows of differing temperatures at the exit or hot face of the rotor. Essentially all regenerative air preheaters used in conjunction with utility steam generators are rotated in the counterflow arrangement as shown in FIG. 1. The hot face of the rotor is part of the rotor that is heated by gas inlet flow 116 as it enters the rotor. As the rotor rotates into the air side air outlet flow 28 and exits the hot face of the rotor where the temperature is the hottest. Primary air flow 23 consists of the hottest portion of air outlet flow 28 and is routed to pulverizer 117. Primary air flow 23 is hotter than secondary air flow 31 when captured leakage flow 97 is not present (as shown in FIG. 5). When captured leakage flow 97 is redirected into the hottest point of the cold end of air side 29 the temperature of primary air flow 23 is increased. This is true for both flows, because the regenerative air preheater recovers about the same fraction or percentage of the temperature head and adds that fraction to the air inlet temperature. The term temperature head refers to the temperature difference between the temperature of gas inlet flow 116 and air inlet flow 24. Since only a fraction of the temperature head is added to the air inlet flow temperature, increasing the air inlet flow temperature, while reducing the temperature head, produces an increase in the air outlet flow temperature.

To illustrate, consider a system with air inlet flow 24 at 75° F., and the air outlet temperature 689° F. Flow 77 consisting of air leakage from both the hot and cold end would have a temperature of about 400° F. Assume no heat loss to ambient, therefore captured leakage flow 97 is also 400° F. Further assume captured leakage flow 97 is 8% of air inlet flow 24 and gas inlet flow 116 temperature is 750° F.

It is should be obvious by those knowledgeable in the field of heat transfer, that when the velocity of flow is increased, the heat transfer coefficient increases. Also understood is that when the heat transfer coefficient is increased, a counterflow regenerative air preheater increases the amount of energy transferred. For simplification, the increase in the heat transfer coefficient will be ignored since in doing so the following example produces conservative numbers.

Also known by those skilled in the art, and as taught in U.S. Pat. No. 6,089,023 to Anderson, et al., the air side effectiveness (EA) and gas side effectiveness (EA) are related. The relationship dictates that when the total rotor air flow the rotor is increased, an increase in gas side effectiveness occurs, but the air side effectiveness decreases. The air effectiveness (EA) is equal to the air outlet temperature (TAO) minus the temperature of the air inlet (TAI) divided by the temperature head TH, where temperature head is equal to the difference in temperatures between the gas inlet and the air inlet. (EA=(TAO−TAI)/TH). Similarly where TGI is the gas inlet temperature and TGO the gas outlet temperature, EG=(TGI−TGO)/TH). In this example the original air preheater design and flow conditions are such that EA=0.909 (EA=(689−75)/(750−75)=0.909). The capacity rates are such that EG=0.709. The gas outlet temperature for assumed temperatures and a gas side effectiveness of 0.709, calculates to be 271° F.

Referring to the assumed numbers and these equations consider a first case where captured leakage flow 97 is allowed to mix with air inlet flow 24. If the small impact of the temperature impact to heat capacity is ignored, when 8% of fluid at 400° F. is added to a flow at 75° F. the resultant temperature is about 95° F. Since captured leakage flow 97 is predominately air flow, there is only a small increase in the fluid flow through the air side of the regenerative air preheater. That increase is the portion of captured leakage flow 97 consisting of flue gas which has been made to flow into a plenum 71. The flow of combustion air from combustion air fan 66 would decrease by the amount of air in captured leakage flow 97 to produce the same total flow of air into boiler as existed without the captured leakage flow. The small increase in the air side flow reduces the air effectiveness is reduced to about 0.897. When 95° F. air flow enters an air preheater with an air side effectiveness of 0.9, the air outlet temperature becomes about 683° F. (solving the equation for EA to find TAO (the air outlet temperature). This is a decrease of about 6 degrees in the temperature of air, so the pulverizer drying capacity is actually decreased. The increase in air inlet flow 24 temperature to 95° F. results in an increase in the temperature of gas outlet flow 120 to 280° F., an increase of 9 degrees, which is a reduction in boiler efficiency of about 0.25%.

Now consider the system of invention as detailed herein where captured leakage flow 97 is kept substantially from mixing with air inlet flow 24. The portion of the rotor that "sees" or is exposed to captured leakage flow 97 at 400° F.

produces an air outlet temperature of 714° F. for the unmixed portion where pulverizer flow 23 is removed. This is an increase of about 25 degrees in the temperature of air, producing a large increase in pulverizer drying capacity. This is equivalent to a 4% increase in the drying capacity to the pulverizer. The gas outlet temperature is the same as the case where mixing is allowed. If the approximately 0.25% reduction in boiler efficiency is undesirable and site specific cost justify, a heat extraction device may be located in flow 78 prior to fan 69. This reduces the temperature of the fluid going to fan 69, thereby reducing its power consumption. The heat recovery device (not shown) may be operated such that only an amount of heat is removed from flow 78, to still provide required pulverizer drying capacity. Since maximum pulverizer drying capacity may exists only at specific coal conditions and loads, an optimization of pulverizer drying capacity and boiler efficiency may be made.

Figure 8:
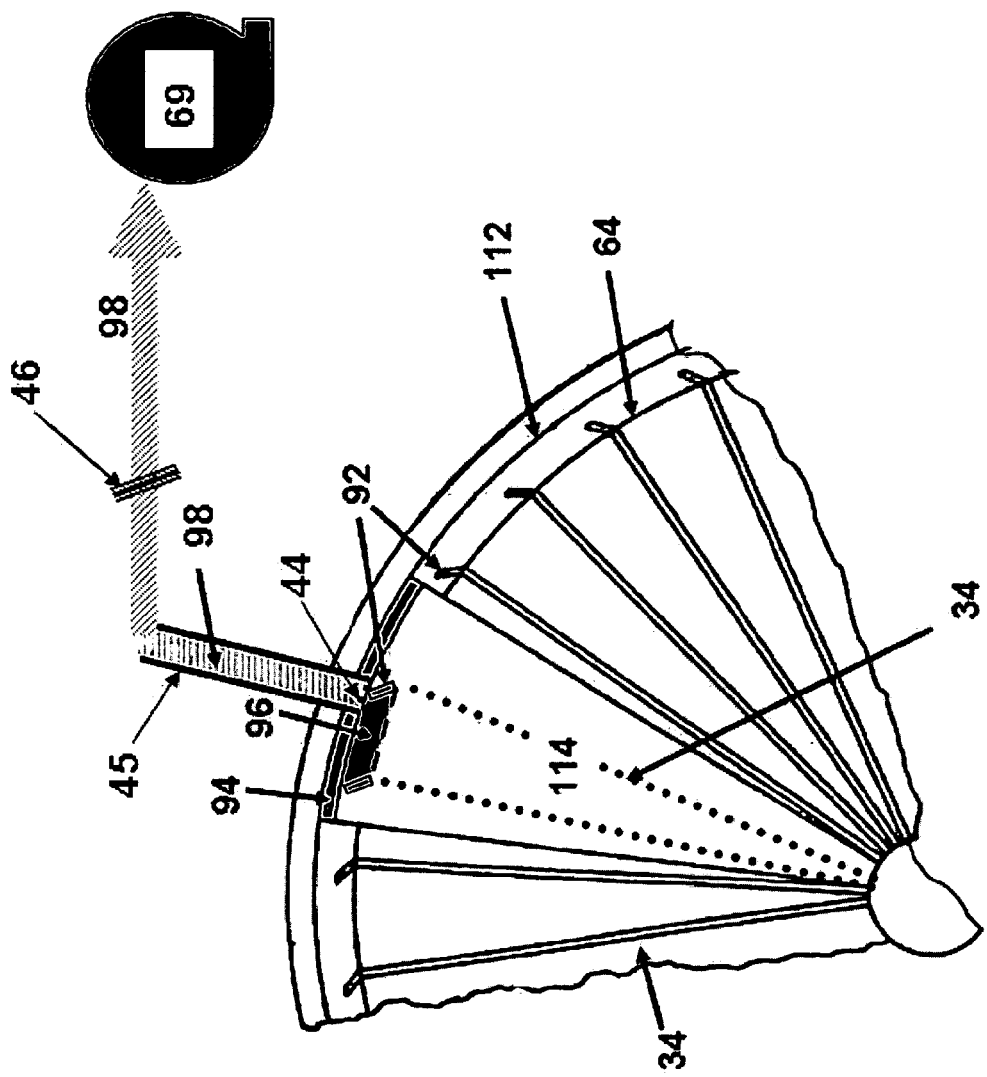
FIG. 8 is a partial plan view of one regenerative air preheater sector plate, axial seal plate and double axial seals with the addition of a penetration and ductwork connected to the axial seal plenum

FIG. 8 is a partial cutaway bottom view of one sector plate 114, axial seal plate 94 and double axial seals 92. FIG. 8 illustrates how plenum 96 between axial seals 92 and axial seal plate 94 is modified by adding a penetration 44, and ductwork 45 to provide flow communication from plenum 96 with fan 69. Flow 98 is made to flow from plenum 96 by regulation of the fan pressure, typically utilizing variable speed drive (not shown) or damper 46.

Figure 9:
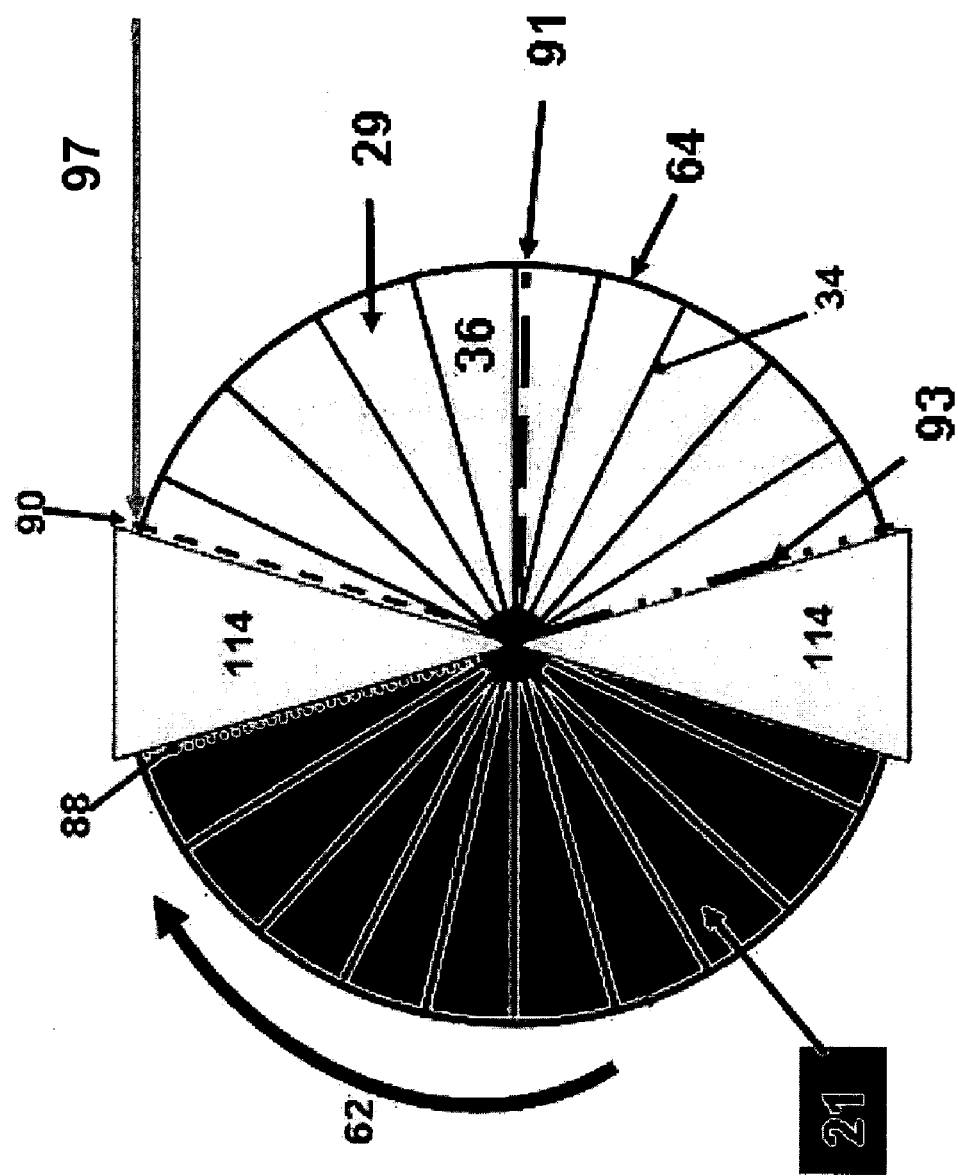
FIG. 9 is a bottom perspective view of the rotor of a bisector air preheater depicting the entry location for the captured leakage flow from a leakage recovery system such as shown in FIGS. 6 & 7.

FIG. 9 is a bottom perspective view of the rotor of a bisector air preheater depicting the entry location of the captured leakage flow 97. Captured leakage flow 97 is introduced at location 90 the location where the element sheets first rotate into the air side from the gas side. Location 90 is where the hot end element sheets are at their highest temperature. Rotation arrow 62 shows that rotor 64 rotates from the hot gas side to the air side and thus produces the hottest element sheets at location 88, just prior to exiting gas side 21. To produce maximum boiler thermal efficiency while capturing and recovering some leakage flows, captured leakage flow 97 is introduced at location 90. Since captured leakage flow 97 is introduced into the air side, and has no sector or sealing plate, the pressure drop through the elements exposed to captured leakage flow 97 and any mixing component from air inlet flow 24 must be the same as for the remainder of the flow.

The rotating elements should be exposed to the low temperature of air inlet flow 24 for a significant portion of time prior to their entering the gas side. If mixing is allowed and the temperature of air inlet flow 24 is increased, the amount of energy recovered from the flue gas will decrease due to the reduced temperature head between the gas in and air in temperature. The preferred and best location for introduction of captured leakage flow 97 into a sector 36 is at approximately location 90 as each sector 36 is first rotated into the air side of the system. FIG. 9 further illustrates the rotor of an air preheater with about five sectors 36 in air side 29. When captured leakage flow 97 is introduced at location 90 the heat gained at the cold end of the element sheets from exposure to the captured leakage flow 97 is removed by exposure to the air inlet flow 24 prior to entering the gas side 21 at location 93. Introduction of captured leakage flow 97 at location 90 provides the maximum time exposure for the elements to "see" the air inlet flow 24 which is the coldest temperature flow.

In another preferred embodiment of the present invention, as the rotor rotates, captured leakage flow 97 is directed to re-enter the rotor on the air side in a range of other positions in a quadrant of the air side of the rotor closest to the sector of the rotor entering the air side from the gas side. The quadrant of the air side where captured leakage flow 97 is directed is between location 90 (where the elements first enter the air side; where the elements are at the hottest temperature) and location 91, (half way through the rotational position within the air side 29). Captured leakage flow 97 enters the preheater separately from the flow of cool air of air inlet flow 24 and is prevented from substantially mixing with air inlet flow 24. The flow of cool air enters the regenerative air preheater in a quadrant of the air side of the rotor farthest from the sector of the rotor entering the air side. The quadrant of the air side where air inlet flow 24 is directed is between location 93 (where the elements are about to leave the air side; the location that the elements are at the coolest temperature) and location 91, (half way through the rotational position within the air side 29). The minimization of mixing produces minimal reduction in temperature head. The introduction of captured leakage flow 97 to the rotor at any location between location 90 and location 91 would require a more costly installation to substantially prevent mixing of captured leakage flow 97 and air inlet flow 24. Again while not optimal, there may be site specific reasons for selecting a recycle fluid flow introduction location slightly different than location 90, such as for example, when space constraints or interference exists such as support steel interference with introduction location 90.

When captured leakage flow 97 is introduced into air side 29 and the air preheater has no sector or sealing plate, the pressure drop through the elements exposed to said flow and any small mixing component from air inlet flow 24 must be the same as for the remainder of air inlet flow 24 in the other sector portions of the rotor. Captured leakage flow 97 is introduced to the element sheets at a selected location which allows maximum exposure while they are at a high temperature and air inlet flow 24 is exposed to the coldest elements for a maximum time on the air side. While a sector plate of some width could be placed between the captured leakage flow 97 and air inlet flow 24, it would create additional pressure drop and does not offer appreciable benefits. If so added the overall system concept and benefits would still remain as disclosed.

To achieve essentially the full benefits of the preferred embodiment of this invention it is not necessary to distribute the captured leakage flow 97 over the complete radius. The innermost portion of the rotor provides only a small amount of area and may be exposed to air inlet flow 24. In another embodiment of the invention a flow header pipe with a distribution of holes along its length is used as a means to achieve the desired introduction of the captured leakage flow 97 into the rotor. A flow header pipe need not extend to the innermost portion of the rotor. If a header pipe is added with multiple holes along its length to distribute flow along the rotor radius, and it is placed in close proximity to the cold end rotor face, use of a location between 90 and 91 may be accomplished with limited and acceptable mixing of captured leakage flow 97 and air inlet flow 24. A simple single point penetration of the appropriate air inlet duct at the proper location will suffice if internal baffles are utilized to maintain substantial separation of the captured leakage flow 97 from air inlet flow 24.

While a preferred form of this invention has been described above and shown in the accompanying drawings, it should be understood that applicant does not intend to be limited to the particular details described above and illustrated in the accompanying drawings. In this regard, the term "means for" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future. Thus, it is seen that the objects of the invention are efficiently obtained. It will be understood that the foregoing description is illustrative of the invention and should not be considered as limiting and that other embodiments of the invention are possible without departing from the invention's spirit and scope.

What is claimed is:

1. A regenerative air preheater leakage recovery system comprising a coal-fired steam generator in fluid communication with at least one regenerative air preheater; said steam generator being adapted to receive a flow of heated combustion air exiting from said at least one regenerative air preheater and to discharge a flow of hot flue gas to said at least one regenerative air preheater;

said at least one regenerative air preheater adapted to receive a flow of cool air in counter flow to said flow of hot flue gas and to provide a heat exchange between said cool air and said hot flue gas to convert said cool air into said heated combustion air exiting to said steam generator;

said at least one regenerative air preheater leakage recovery system further comprising a first flow of heated air, routed through a source of pulverized coal to form a mixture comprising heated air and pulverized coal; said mixture being directed to said steam generator for combustion therein; and a combination of seals for effecting at least one plenum that is in fluid communication with said heated combustion air flow and said flue gas flow relative to said at least one regenerative air preheater;

a fan for effecting control of said plenum to capture a leakage flow from said flow of heated combustion air and said flow of cool air;

a discharge of said leakage flow to re-enter said at least one regenerative air preheater at a location substantially separate from where said flow of cool air is received in said at least one regenerative air preheater to be further heated therein and exit as said flow of heated combustion air.

2. The regenerative air preheater leakage recovery system recited in claim 1 wherein said combination of seals for effecting at least one plenum is a combination radial seals.

3. The regenerative air preheater leakage recovery system recited in claim 1 wherein said combination of seals for effecting at least one plenum is a combination axial seals.

4. The regenerative air preheater leakage recovery system recited in claim 1 wherein said combination of seals for effecting at least one plenum is a combination circumferential seals.

5. The regenerative air preheater leakage recovery system recited in claim 1 wherein said combination of seals for effecting at least one plenum is a combination radial seals and axial seals.

6. The regenerative air preheater leakage recovery system recited in claim 1 wherein said combination of seals for effecting at least one plenum is a combination of radial seals and circumferential seals.

7. A regenerative air preheater leakage recovery system according to claim 1 wherein said leakage flow re-enters said at least one regenerative air preheater in sectors in a quadrant of said air side of said rotor closest to a sector of said rotor entering said air side from said gas side; and said flow of cool air enters sectors of said at least one regenerative air preheater substantially separate from said sectors said leakage flow re-enters said at least one regenerative air preheater.

8. A regenerative air preheater leakage recovery system according to claim 7 wherein said leakage flow re-enters said at least one regenerative air preheater in a region proximate to said sector of said rotor entering said air side from said gas side as said rotor rotates.

9. The regenerative air preheater leakage recovery system recited in claim 1 wherein said flow of heated combustion air is under a magnitude of pressure and said plenum is under a magnitude of pressure; and said fan for effecting control of said plenum maintains said magnitude of pressure of said plenum at a lower magnitude of pressure than said magnitude of pressure of said flow of heated combustion air.

10. A regenerative air preheater leakage recovery system according to claim 1 wherein said leakage flow is directed first through a heat extraction device.

11. A regenerative air preheater leakage recovery system according to claim 10 wherein said heat extraction device is a heat exchanger for heat exchange therein with a lower temperature fluid.

12. A regenerative air preheater leakage recovery system according to claim 10 wherein said heat extraction device is a component in an electric power generation system.

13. A regenerative air preheater leakage recovery system according to claim 10 which further comprises a means for regulating the amount of energy that is extracted from said leakage flow by said heat extraction device.

* * * * *